US007617957B2

(12) United States Patent

Holderfield et al.

(10) Patent No.: US 7,617,957 B2

(45) Date of Patent: Nov. 17, 2009

(54) MOUNTING SYSTEM FOR THE EXHAUST GAS DEFLECTOR OF A POWER TOOL

(75) Inventors: Greg Holderfield, Oak Park, IL (US); Joey Nakayama, Chicago, IL (US); Michael Johnson, Round Lake, IL (US); Ricardo Segura, Lake In The Hills, IL (US); Bryan Schieler, Sycamore, IL (US)

(73) Assignee: Illinois Tool Works Inc., Glenview, IL (US)

( * ) Notice: Subject to any disclaimer, the term of this patent is extended or adjusted under 35 U.S.C. 154(b) by 120 days.

(21) Appl. No.: 11/878,870

(22) Filed: Jul. 27, 2007

(65) Prior Publication Data

US 2008/0035212 A1 Feb. 14, 2008

Related U.S. Application Data

(60) Provisional application No. 60/837,293, filed on Aug. 14, 2006.

(51) Int. Cl.
*F16K 27/00* (2006.01)

(52) U.S. Cl. ........................................ 227/10; 227/156

(58) Field of Classification Search .................. 227/10, 227/156; 173/218
See application file for complete search history.

(56) References Cited

U.S. PATENT DOCUMENTS

| | | | |
|---|---|---|---|
| 4,721,240 | A | 1/1988 | Cotta |
| 5,322,189 | A | 6/1994 | Oda |
| 5,816,469 | A | 10/1998 | Ohuchi |
| 6,494,355 | B2 | 12/2002 | Adachi et al. |
| 6,612,476 | B2 | 9/2003 | Smolinski |
| 6,808,101 | B2 | 10/2004 | Laubach et al. |
| 2001/0030218 | A1 | 10/2001 | Adachi et al. |
| 2005/0001007 | A1 | 1/2005 | Butzen et al. |

*Primary Examiner*—Brian D Nash
(74) *Attorney, Agent, or Firm*—Law Offices of Steven W. Weinrieb

(57) ABSTRACT

A new and improved mounting system, for fixedly mounting an exhaust gas deflector component upon the upper cap member of a pneumatically-powered fastener-driving tool, comprises a fastener disposed internally within the upper cap member of the pneumatically-powered fastener-driving tool and not extending externally through the exhaust gas deflector component. In this manner, not only does the exhaust gas deflector component of the pneumatically-powered fastener-driving tool exhibit an aesthetically pleasing external appearance, but in addition, the absence of any externally visible fastener structure, extending through the exhaust gas deflector component, permits various indicia, such as, for example, the company logo, to effectively be incorporated upon the external surface portion of the exhaust gas deflector component.

15 Claims, 3 Drawing Sheets

MOUNTING SYSTEM FOR THE EXHAUST GAS DEFLECTOR OF A POWER TOOL

CROSS-REFERENCE TO RELATED PATENT APPLICATION

This patent application is related to, based upon, and effectively a utility patent application conversion from U.S. Provisional Patent Application Ser. No. 60/837,293, which was filed on Aug. 14, 2006, the filing date benefits of which are hereby respectfully claimed.

FIELD OF THE INVENTION

The present invention relates generally to power tools, and more particularly to a new and improved mounting system for fixedly mounting or securing an exhaust gas deflector component upon the upper cap member or upper cap portion of a pneumatically-powered fastener-driving tool, wherein the mounting system effectively mounts or secures the deflector component upon the upper cap member or upper cap portion of the pneumatically-powered fastener-driving tool from a position located internally within the upper cap member or upper cap portion of the pneumatically-powered fastener-driving tool such that, not only does the deflector component of the pneumatically-powered fastener-driving tool exhibit an aesthetically pleasing external appearance, but in addition, the absence of any externally visible fastener structure, extending the deflector component for normally fixedly mounting or securing the deflector component upon the upper cap member or upper cap portion of the pneumatically-powered fastener-driving tool, permits various indicia, such as, for example, the company logo, the tool name, the tool model number, or the like, to effectively be incorporated upon the external surface portion of the deflector component.

BACKGROUND OF THE INVENTION

Pneumatically-powered fastener-driving tools are conventionally provided with an upper cap member or upper cap portion which has, for example, an exhaust gas slot or exhaust gas passageway defined therein for permitting exhaust gases to be exhausted therethrough during the exhaust portion of the tool-firing cycle. In addition, an exhaust gas deflector component is fixedly mounted upon the upper cap member or upper cap portion of the pneumatically-powered fastener-driving tool so as to effectively cooperate with the upper cap member or upper cap portion of the pneumatically-powered fastener-driving tool in order to properly route or conduct the exhaust gases toward the exhaust gas slot or exhaust gas passageway during the aforenoted exhaust portion of the tool-firing cycle. An example of a conventional, PRIOR ART pneumatically-powered fastener-driving tool is illustrated within FIG. 1 and is generally indicated by the reference character 10. The upper cap member or upper cap portion of the pneumatically-powered fastener-driving tool 10 is disclosed at 12, while the exhaust gas deflector component is disclosed at 14.

The upper cap member or upper cap portion 12 comprises an annular rim or radially outer peripheral portion 16, and a plurality of fasteners 18, passing through circumferentially spaced portions of the annular rim or radially outer peripheral portion 16 of the upper cap member or upper cap portion 12, are adapted to fixedly secure the upper cap member or up-per cap portion 12 of the pneumatically-powered fastener-driving tool 10 to an upper end portion of the pneumatically-powered, fastener-driving tool housing, not shown. In addition, the exhaust gas deflector component 14 is similarly adapted to be fixedly secured to a fixed support, mounting base, or similar structure, not illustrated but located internally within the pneumatically-powered, fastener-driving tool, by means of an additional, externally installed fastener 20 which is disposed substantially coaxially with respect to both the upper cap member or upper cap portion 12, and the exhaust gas deflector component 14, of the pneumatically-powered, fastener-driving tool 10. Accordingly, it can be appreciated that the disposition of the externally installed fastener 20 within the central portion of the exhaust gas deflector component 14, which also renders the fastener 20 externally visible, not only detracts from the aesthetic appearance of the exhaust gas deflector component 14 of the pneumatically-powered fastener-driving tool 10 in that the presence of the fastener 20, at the central portion of the deflector component 14, effectively mars or ruins the clean appearance of the external surface portion of the exhaust gas deflector component 14, but in addition, the presence of the fastener 20 at the central portion of the exhaust gas deflector component 14 of the pneumatically-powered fastener-driving tool 10 effectively prevents the incorporation of desirable indicia upon the external surface portion of the exhaust gas deflector component 14 of the pneumatically-powered fastener-driving tool 10, such as, for example, the company logo, the tool name, the tool model number, or the like.

A need therefore exists in the art for a new and improved mounting system for fixedly mounting or securing an exhaust gas deflector component upon the upper cap member or the upper cap portion of a pneumatically-powered fastener-driving tool, wherein the mounting system would effectively mount or secure the exhaust gas deflector component upon the upper cap member or the upper cap portion of the pneumatically-powered fastener-driving tool in such a manner that the fastener, for fixedly securing or mounting the exhaust gas deflector component upon the upper cap member or the upper cap portion of the pneumatically-powered fastener-driving tool, would not be externally visible whereby not only would the exhaust gas deflector component of the pneumatically-powered fastener-driving tool thereby exhibit an aesthetically pleasing external appearance, but in addition, the absence of the externally visible fastener structure, extending or passing through the exhaust gas deflector component for normally fixedly mounting or securing the exhaust gas deflector component upon the upper cap member or the upper cap portion of the pneumatically-powered fastener-driving tool, would permit various indicia, such as, for example, the company logo, the tool name, the tool model number, or the like, to effectively be incorporated upon the external surface portion of the exhaust gas deflector component.

SUMMARY OF THE INVENTION

The foregoing and other objectives are achieved in accordance with the teachings and principles of the present invention through the provision of a new and improved mounting system, for fixedly mounting or securing an exhaust gas deflector component upon the upper cap member or the upper cap portion of a pneumatically-powered fastener-driving tool, wherein the mounting system effectively mounts or secures the exhaust gas deflector component upon the upper cap member or the upper cap portion of the pneumatically-powered fastener-driving tool by means of a suitable fastener which is disposed at a position which is located internally within the upper cap member or the upper cap portion of the pneumatically-powered fastener-driving tool. In this manner, not only does the exhaust gas deflector component of the pneumatically-powered fastener-driving tool exhibit an aesthetically pleasing external appearance, but in addition, the absence of any externally visible fastener structure, extending or passing through the exhaust gas deflector component for normally fixedly mounting or securing the exhaust gas deflector component upon the upper cap member or the upper cap portion of the pneumatically-powered fastener-driving tool, permits various indicia, such as, for example, the company logo, the tool name, the tool model number, or the like, to effectively be incorporated upon the external surface portion of the exhaust gas deflector component.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 4:
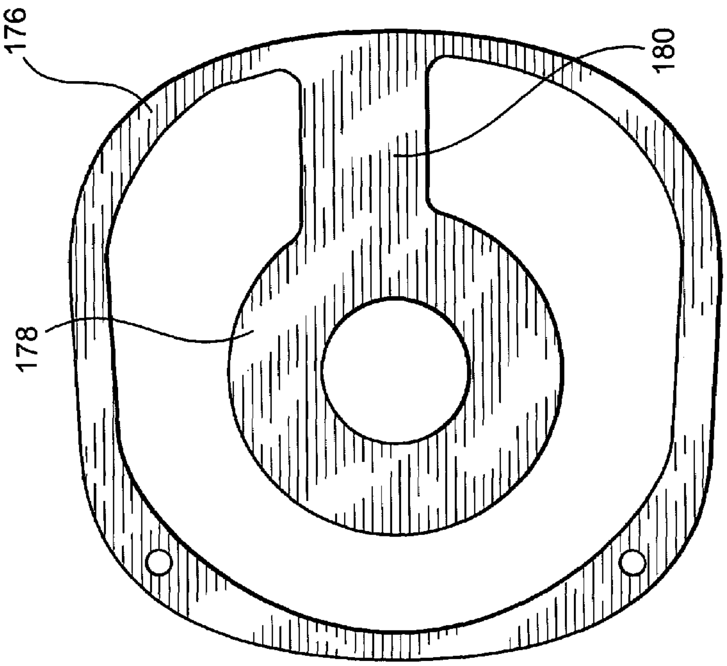
FIG. 4 is a top plan view of the gasket component interposed between the upper cap member or upper cap portion of the pneumatically-powered fastener-driving tool, and the exhaust gas deflector component of the pneumatically-powered fastener-driving tool.

Referring now to the drawings, and more particularly to FIGS. 2-5 thereof, a new and improved mounting system, developed in accordance with the principles and teachings of the present invention, for mounting the exhaust gas deflector component atop a pneumatically-powered fastener-driving tool is disclosed and is generally indicated by the reference character 110. More particularly, as can best be seen from an overall perspective as illustrated within FIG. 5, the pneumatically-powered fastener-driving tool 112 is seen to comprise a main housing 114, a fastener magazine 116, and a handle portion 118 by means of which a tool operator can hold and carry the pneumatically-powered fastener-driving tool 112. An upper cap member, or an upper cap portion, 120 of the pneumatically-powered fastener-driving tool 112 is adapted to be fixedly secured to an upper end portion of the pneumatically-powered fastener-driving tool housing 114, and an exhaust gas deflector component 122 is adapted to be secured atop, and thereby cover, the axially central region of the upper cap member, or upper cap portion, 120 of the pneumatically-powered fastener-driving tool 112. In particular, as can best be appreciated from FIG. 2, the upper cap member, or upper cap portion, 120 of the pneumatically-powered fastener-driving tool 112 comprises an outer peripheral edge portion 124, and a plurality of circumferentially spaced recessed regions 126 are defined within the outer peripheral edge portion 124. A suitable fastener 128 is disposed within each one of the circumferentially spaced recessed regions 126 in order to fixedly secure the upper cap member, or upper cap portion, 120 to the upper end portion of the pneumatically-powered fastener-driving tool 112, as can also be appreciated from FIG. 3, and an annular 0-ring or gasket 130 is adapted to be interposed between the lower annular edge portion of the upper cap member, or upper cap portion, 120 and the upper annular edge portion of the upper end portion of the main housing 114 of the pneumatic-ally-powered fastener-driving tool 112 so as to fluidically seal the mated assembly defined by means of the upper cap member, or upper cap portion, 120 and the main housing 114.

Figure 3:
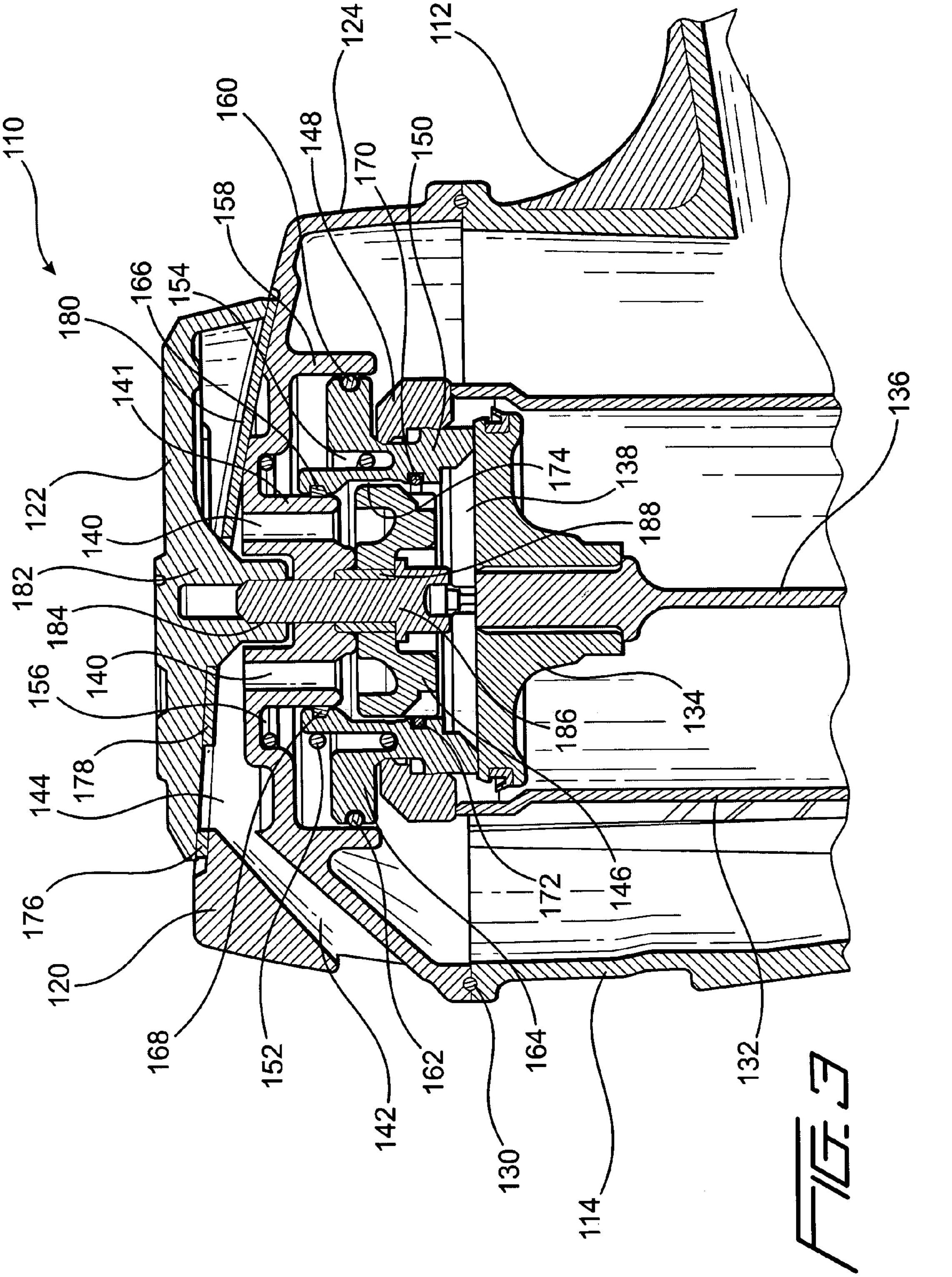
FIG. 3 is a vertical cross-sectional view showing the upper end portion of the pneumatically-powered fastener-driving tool upon which the upper cap member or upper cap portion, and the exhaust gas deflector component, are fixedly mounted.

With reference continuing to be made to FIG. 3, additional structural details of the new and improved mounting system 110, constructed in accordance with the principles and teachings of the present invention, for mounting the exhaust gas deflector component 122 atop the upper cap member, or upper cap portion, 120 of the pneumatically-powered fastener-driving tool 112, will now be described in conjunction with existing structural components of the pneumatically-powered fastener-driving tool 112. More particularly, for example, the pneumatically-powered fastener-driving tool 112 is seen to additionally comprise a working cylinder 132 within which a working piston 134 is adapted to be movably disposed, and a fastener driver blade 136 is fixedly mounted in a coaxial manner within the working piston 134 so as to drive a fastener outwardly from the pneumatically-powered fastener-driving tool 112 when the working piston 134 is moved downwardly under the influence of pressurized air which is fluidically routed into an air chamber 138, located above the working piston 134, during the fastener-driving phase of the tool firing cycle. A plurality of axially oriented exhaust gas passageways 140, disposed within an annular array, are defined within a substantially central, annular dependent portion 141 of the upper cap member, or upper cap portion, 120 so as to effectively extend through the central portion 141 of the upper cap member or upper cap portion 120 from an undersurface portion of the upper cap member, or upper cap portion, 120 to an upper surface portion of the upper cap member, or upper cap portion, 120, and a substantially radially oriented exhaust gas passageway 142 is defined within one side portion of the upper cap member, or upper cap portion, 120.

In addition, it can be appreciated that when the exhaust gas deflector component 122 is fixedly secured atop the upper cap member, or upper cap portion, 120 of the pneumatically-powered fastener-driving tool 112, the undersurface portion of the exhaust gas deflector component 122 will effectively define, along with the upper surface portion of the upper cap member, or upper cap portion, 120 an annular exhaust gas chamber 144 which fluidically interconnects the plurality of axially oriented exhaust gas passageways 140 to the substantially radially oriented exhaust gas passageway 142. Still further, an annular valve post 146 is fixedly mounted at a substantially axially central position within the pneumatically-powered fastener-driving tool 112 so as to effectively be disposed within the upper end portion of the air chamber 138, and an annular valve seal 148 is disposed atop the upper end portion of the working cylinder 132.

An annular poppet valve 150 is radially interposed between the radially inner annular valve post 146 and the radially outer annular valve seal 148, and is adapted to be vertically movable between upper and lower positions so as to, for example, appropriately control the flow of air and exhaust gases during, for example, the various phases of the tool firing cycle. More particularly, in addition to the poppet valve 150 being pneumatically controlled by incoming pressurized air, as is well-known in the art, the poppet valve 150 also has operatively associated therewith an annular coil valve spring 152 which has a lower end portion thereof disposed within an annular recess 154 defined within the poppet valve 150, while an upper end portion of the annular coil valve spring 152 is disposed within an annular recess 156 defined within an undersurface portion of the upper cap member or upper cap portion 120. The undersurface portion of the upper cap member or upper cap portion 120 is also provided with an annular, dependent wall member 158, and a first O-ring seal member 160 is disposed within a first annular recessed portion 162 which is defined within an upper radially outwardly projecting flanged member 164 of the poppet valve 150 for providing sealing properties between the external peripheral surface or edge portion of the flanged member 164 and the radially inner surface portion of the annular dependent wall member 158 as the poppet valve 150 moves along the radially inner surface portion of the annular dependent wall member 158.

In a similar manner, a second 0-ring seal member 166 is disposed within a second annular recessed portion 168, which is defined within an upper radially inner surface portion of the poppet valve 150, for providing sealing properties between the radially inner surface portion of the poppet valve 150 and the radially outer surface portion of the dependent portion 141 of the upper cap member, or upper cap portion, 120. Still further, a third O-ring seal member 170 is disposed within a third annular recessed portion 172 which is defined within a lower radially inner surface portion of the poppet valve 150, and it is also seen that the lower axial end portion of the valve post 146 has a smaller external diametrical extent than that of the upper axial end portion of the valve post 146, while the radially inner annular surface portion of the poppet valve 150, interposed between the second and third O-ring seal members 166,170, is recessed radially inwardly as at 174. Accordingly, as can best be appreciated from FIG. 3, when the poppet valve 150 is disposed at its lowered position, as is illustrated within FIG. 3, an exhaust gas flow path is defined from the air chamber 138, upwardly between the lower axial end portion of the valve post 146 and the lower end portion of the poppet valve 150 within which the third O-ring seal member 170 is disposed, upwardly between the upper axial end portion of the valve post 146 and the radially inwardly recessed portion 174 of the poppet valve 150, upwardly through the plurality of exhaust gas passageways 140, through the exhaust gas chamber 144, and out through the exhaust gas passageway 142.

Alternatively, when the poppet valve 150 is moved to, and disposed at, its upper or raised position, as when the pneumatically-powered fastener-driving tool workpiece contact element and trigger assemblies, not shown, are actuated, whereby the supply of incoming compressed air, previously routed toward and impacting upon the upper surface portion of the poppet valve 150, is now effectively re-routed so as to impact upon the undersurface portion of the upper radially outwardly projecting flanged member 164 of the poppet valve 150, while substantially simultaneously therewith, the air space, disposed or defined above the poppet valve 150, is now opened to the atmosphere, the upward movement of the poppet valve 150 will also cause the annular valve seal 148 to be moved upwardly and thereby be unseated from its disposition atop the upper end portion of the working cylinder 132. Thus, at this point in time, the third O-ring seal member 170 will be disposed in sealed engagement with the upper axial end portion of the valve post 146 so as to block the afore-noted exhaust gas flow path, and the unseating of the valve seal 148 from its disposition atop the working cylinder 132 will permit incoming air to enter the air chamber 138 disposed above the working piston 134 in preparation for a tool-firing and piston-driving cyclic operation.

Continuing further, it is noted that when the exhaust gas deflector component 122 is fixedly secured atop the upper cap member, or upper cap portion, 120 of the pneumatically-powered fastener-driving tool 112, in order to enclose the upper end or surface of the exhaust gas chamber 144, an annular gasket 176, as can best be appreciated from FIG. 4, is interposed between the annular radially outer peripheral edge portion of the exhaust gas deflector component 122 and an upper external surface portion of the upper cap member, or upper cap portion, 120 of the pneumatically-powered fastener-driving tool 112. In this manner, the interface defined between the annular radially outer peripheral edge portion of the exhaust gas deflector component 122, and the upper external surface portion of the upper cap member, or upper cap portion, 120 of the pneumatically-powered fastener-driving tool 112, will be fluidically sealed. The gasket 176 may also be provided with a central annular flap portion 178 which is integrally connected to the annular gasket 176 by means of a radially extending connector member 180, the inner annular flap portion 178 being adapted to being disposed around an axially central dependent boss portion 182, defined upon the undersurface portion of the exhaust gas deflector component 122, so as to optionally provide noise-deadening properties to the pneumatically-powered fastener-driving tool 112. Still yet further, in accordance with additional principles and teachings of the present invention, in order to fixedly mount the exhaust gas deflector component 122 upon or atop the upper cap member, or upper cap portion, 120 of the pneumatically-powered, fastener-driving tool 112, the axially central dependent boss portion 182 of the exhaust gas deflector component 122 is provided with an internally threaded bore 184 within which the forward end portion of an externally threaded screw fastener 186 is adapted to be threadedly engaged.

Accordingly, when the rearward shank portion of the screw fastener 186 is disposed within the valve post 146 through means of a bushing 188, while the central shank portion of the screw fastener 186 passes through the axially central dependent portion 141 of the upper cap member, or upper cap portion, 120, and when the screw fastener 186 is fully threadedly engaged within the threaded bore 184 of the exhaust gas deflector component 122, the exhaust gas deflector component 122 will be fixedly secured upon or atop the upper cap member, or upper cap portion, 120 of the pneumatically-powered fastener-driving tool 112. Therefore, as can be appreciated from FIGS. 2 and 3, as a result of the fixation of the exhaust gas deflector component 122 upon or atop the upper cap member, or upper cap portion, 120 of the pneumatically-powered fastener-driving tool 112 by means of the screw fastener 186, wherein the screw fastener 186 is mounted within the valve post 146, wherein the screw fastener 186 is also mounted within the axially central dependent portion 141 of the upper cap member, or upper cap portion, 120, and wherein the screw fastener 186 is also threadedly engaged within the internally disposed dependent boss portion 182 of the exhaust gas deflector component 122, the screw fastener 186 does not extend through the exhaust gas deflector component 122, the screw fastener 186 is not accessible from a position external to the exhaust gas deflector component 122, and the screw fastener 186 is not visible from a position external of the exhaust gas deflector component 122 and the pneumatically-powered fastener-driving tool 112 as was the case with the screw fastener 20 utilized for mounting the exhaust gas deflector component 14 upon the conventional, PRIOR ART pneumatically-powered fastener-driving tool 10 as disclosed in FIG. 1.

Figure 1:
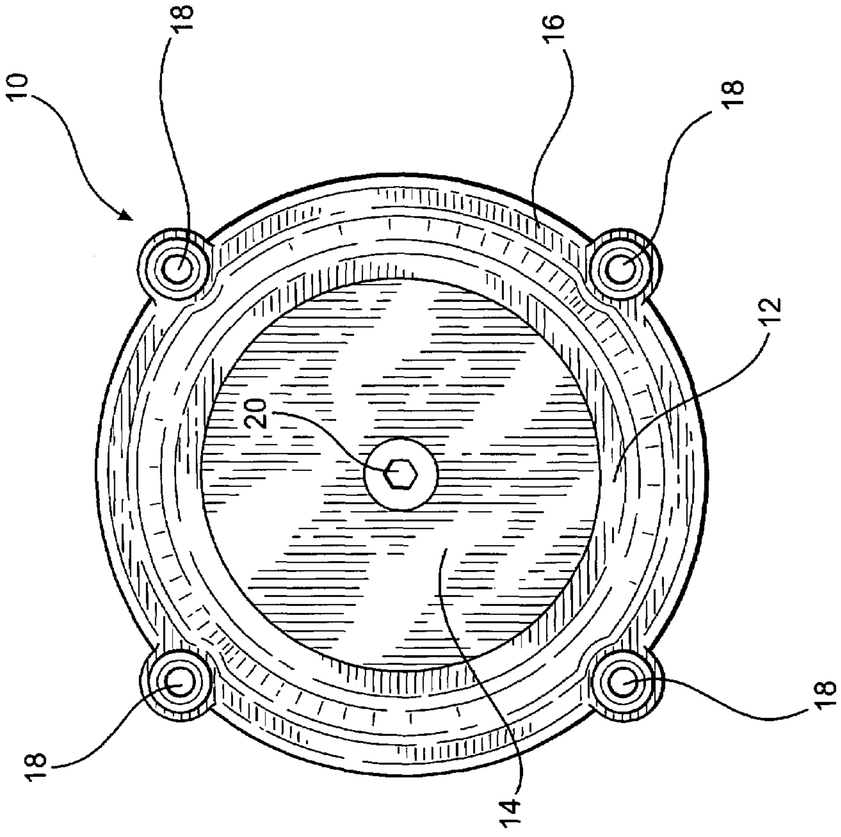
FIG. 1 (PRIOR ART)
FIG. 1 is a top plan view of a conventional, PRIOR ART pneumatically-powered fastener-driving tool showing the upper cap member or upper cap portion as secured to an upper end portion of the housing of the pneumatically-powered fastener-driving tool, as well as the exhaust gas deflector component as being secured to an inner support member of the pneumatically-powered fastener-driving tool by means of an externally installed, and externally visible, coaxially disposed fastener.
Figure 2:
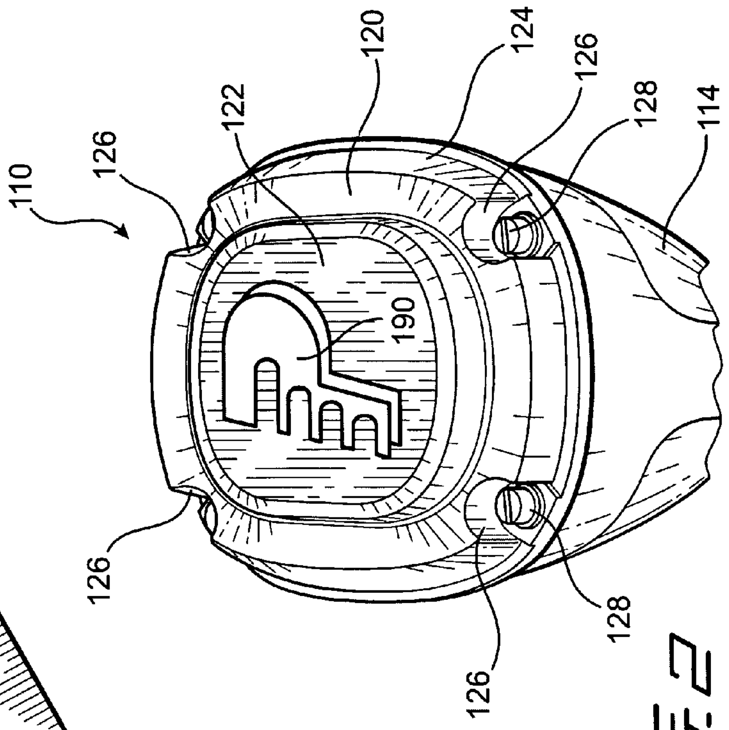
FIG. 2 is a top perspective view of a pneumatically-powered fastener-driving tool showing the new and improved mounting system, developed in accordance with the principles and teachings of the present invention, wherein the upper cap member or the upper cap portion of the pneumatically-powered fastener-driving tool is secured to an upper end portion of the pneumatically-powered fastener-driving tool housing, and wherein further, the exhaust gas deflector component is adapted to be secured to an inner support member of the pneumatically-powered fastener-driving tool by means of an internally installed, coaxially disposed fastener whereby the fastener is not externally visible so as to effectively provide the external surface portion of the exhaust gas deflector component with an aesthetically pleasing appearance upon which suitable indicia, such as, for example, the company logo, can be provided.
Figure 5:
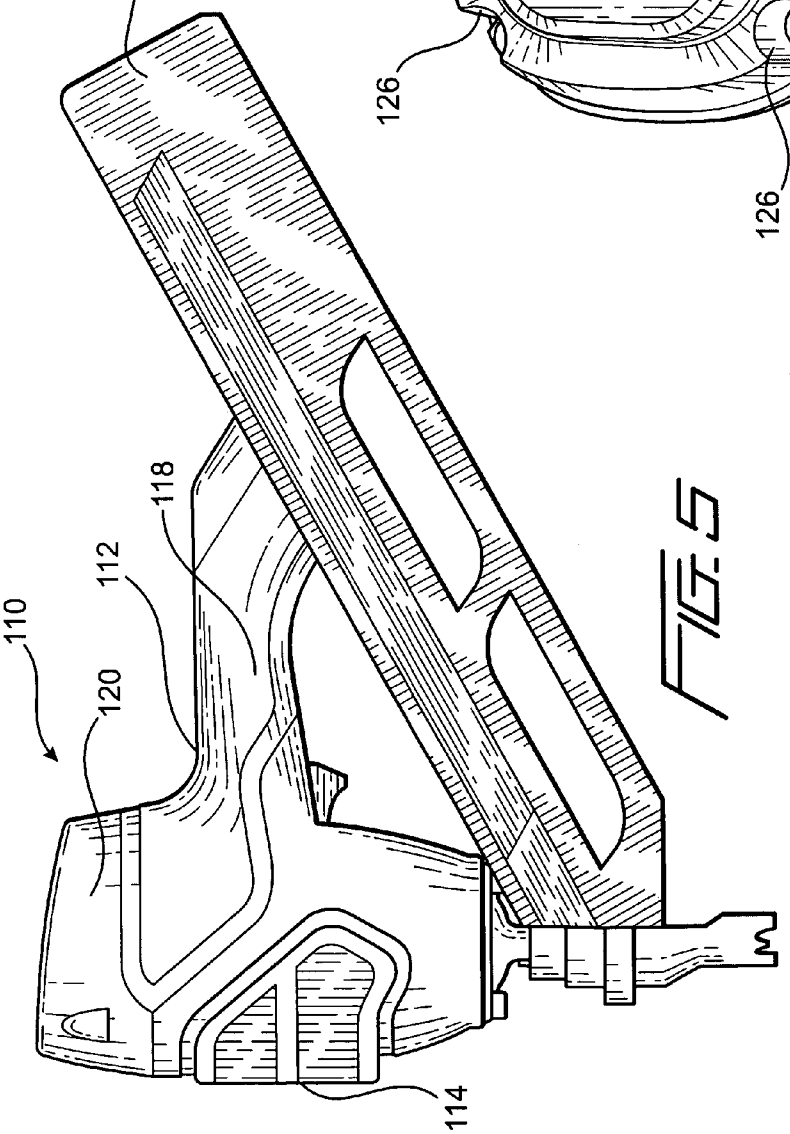
FIG. 5 is a side elevational view of a pneumatically-powered fastener-driving tool having the new and improved mounting system of the present invention incorporated therein wherein the upper cap member or the upper cap portion of the pneumatically-powered fastener-driving tool is secured to an upper end portion of the pneumatically-powered fastener-driving tool housing and wherein further, the exhaust gas deflector component is secured to an inner support member of the pneumatically-powered fastener-driving tool by means of an internally installed, coaxially disposed fastener whereby the fastener is not externally visible so as to effectively provide the external surface portion of the deflector component with an aesthetically pleasing appearance upon which suitable indicia, such as, for example, the company logo, can be provided.

Accordingly, the external surface portion of the exhaust gas deflector component 122 is provided with a clean or aesthetically pleasing appearance which is effectively unmarred, for example, by means of a centrally located fastener similar to the fastener 20 utilized for mounting the exhaust gas deflector component 14 upon the conventional, PRIOR ART pneumatically-powered fastener-driving tool 10 as disclosed in FIG. 1. Therefore, accordingly still further, suitable indicia can therefore be embossed or otherwise fixedly or integrally incorporated upon the external surface portion of the exhaust gas deflector component 122. In particular, as can best be appreciated from FIG. 2, the external surface portion of the exhaust gas deflector component 122 has been provided with a stylized P, as designated by means of the reference character 190, which comprises or represents the company logo for PASLODE, the manufacturer of the pneumatically-powered fastener-driving tool 112.

Thus, it may be seen that in accordance with the principles and teachings of the present invention, there has been disclosed a new and improved mounting system, for fixedly mounting or securing an exhaust gas deflector component upon the upper cap member or the upper cap portion of a pneumatically-powered fastener-driving tool, wherein the mounting system effectively mounts or secures the exhaust gas deflector component upon the upper cap member or the upper cap portion of the pneumatically-powered fastener-driving tool by means of a suitable fastener which is disposed at a position which is located internally within the upper cap member or the upper cap portion of the pneumatically-powered fastener-driving tool. In this manner, not only does the exhaust gas deflector component of the pneumatically-powered fastener-driving tool exhibit an aesthetically pleasing external appearance, but in addition, the absence of any externally visible fastener structure, extending or passing through the exhaust gas deflector component for normally fixedly mounting or securing the exhaust gas deflector component upon the upper cap member or the upper cap portion of the pneumatically-powered fastener-driving tool, permits various indicia, such as, for example, the company logo, the tool name, the tool model number, or the like, to effectively be incorporated upon the external surface portion of the exhaust gas deflector component.

Obviously, many variations and modifications of the present invention are possible in light of the above teachings. For example, while the present invention has been disclosed and described in connection with securing the exhaust gas deflector component upon the upper cap member or upper cap portion of a pneumatically-powered fastener-driving tool, similar teaching, principles, and mounting systems can likewise be applicable to other tools powered by other means. It is therefore to be understood that within the scope of the appended claims, the present invention may be practiced otherwise than as specifically described herein.

What is claimed as new and desired to be protected by letters patent of the United States of America, is:

1. A mounting system for an exhaust gas deflector component of a power tool, comprising:

a housing;

a cap member fixedly secured atop said housing so as to define an upper cap portion;

an exhaust gas deflector component disposed above and atop said cap member and said upper cap portion of said cap member so as to effectively cover said upper cap portion of said cap member and to define, with said upper cap portion of said cap member, an exhaust gas passageway for exhaust gases of said power tool;

wherein an internal portion of said exhaust gas deflector component comprises an axially central, internally projecting, dependent boss member having an internally threaded bore defined therein; and an externally threaded axially oriented fastener disposed internally within said cap member for threadedly engaging said internally threaded bore defined within said axially central, internally projecting, dependent boss member of said exhaust gas deflector component so as to fasten said exhaust gas deflector component upon said upper cap portion of said cap member whereby said exhaust gas deflector component will cover said upper cap portion of said cap member without said fastener being visible from a position external to said exhaust gas deflector component.

2. The mounting system as set forth in claim 1, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said fastener will not be visible from a position external to said exhaust gas deflector component.

3. The mounting system as set forth in claim 1, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said external surface portion of said exhaust gas deflector component is provided with a clean, aesthetically pleasing appearance.

4. The mounting system as set forth in claim 1, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said external surface portion of said exhaust gas deflector component is provided with a clean, aesthetically pleasing appearance upon which suitable indicia is integrally incorporated.

5. The mounting system as set forth in claim 4, wherein:

said indicia is selected from the group comprising a company logo, a tool name, a tool model, and a tool model number.

6. The mounting system as set forth in claim 1, wherein:

said cap member has an external surface portion;

said exhaust gas deflector component has an outer peripheral edge portion adapted to engage said external surface portion of said cap member when said exhaust gas deflector component is fastened upon said cap member; and a gasket is interposed between said outer peripheral edge portion of said exhaust gas deflector component and said external surface portion of said cap member for fluidically sealing the interface defined between said outer peripheral edge portion of said exhaust gas deflector component and said external surface portion of said cap member.

7. The mounting system as set forth in claim 1, wherein:

said cap member has an outer peripheral edge portion; and a plurality of fasteners are disposed within a circumferentially spaced array around said outer peripheral edge portion of said cap member for fixedly securing said cap member upon said housing.

8. A fastener-driving tool, comprising:

a housing;

a cylinder defined within said housing;

a piston movably disposed within said cylinder;

a driver blade fixedly connected to said piston;

a magazine for containing a plurality of fasteners to be driven outwardly from said fastener-driving tool by said drive blade;

a cap member fixedly secured atop said housing so as to define an upper cap portion;

an exhaust gas deflector component disposed above and atop said cap member and said upper cap portion so as to effectively cover said upper cap portion of said cap member and to define, with said upper cap portion of said cap member, an exhaust passageway for exhaust gases of said power tool;

wherein an internal portion of said exhaust gas deflector component comprises an axially central, internally projecting, dependent boss member having an internally threaded bore defined therein; and an externally threaded axially oriented fastener is disposed internally within said cap member for threadedly engaging said internally threaded bore defined within said axially central, internally projecting, dependent boss member of said exhaust gas deflector component so as to fasten said exhaust gas deflector component upon said upper cap portion of said cap member whereby said exhaust gas deflector component will cover said upper cap portion of said cap member without said fastener being visible from a position external to said exhaust gas deflector component.

9. The fastener-driving tool as set forth in claim 8, wherein:

said power tool comprises a pneumatically-driven power tool.

10. The fastener-driving tool as set forth in claim 8, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said fastener will not be visible from a position external to said exhaust gas deflector component.

11. The fastener-driving tool as set forth in claim 8, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said external surface portion of said exhaust gas deflector component is provided with a clean, aesthetically pleasing appearance.

12. The fastener-driving tool as set forth in claim 8, wherein:

said fastener is disposed internally within said cap member and is operatively engaged with said internal portion of said exhaust gas deflector component so as not to extend through said exhaust gas deflector component and thereby not project outwardly through any external surface portion of said exhaust gas deflector component whereby said external surface portion of said exhaust gas deflector component is provided with a clean, aesthetically pleasing appearance upon which suitable indicia is integrally incorporated.

13. The fastener-driving tool as set forth in claim 12, wherein:

said indicia is selected from the group comprising a company logo, a tool name, a tool model, and a tool model number.

14. The fastener-driving tool as set forth in claim 8, wherein:

said cap member has an external surface portion;

said exhaust gas deflector component has an outer peripheral edge portion adapted to engage said external surface portion of said cap member when said exhaust gas deflector component is fastened upon said cap member; and a gasket is interposed between said outer peripheral edge portion of said exhaust gas deflector component and said external surface portion of said cap member for fluidically sealing the interface defined between said outer peripheral edge portion of said exhaust gas deflector component and said external surface portion of said cap member.

15. The fastener-driving tool as set forth in claim 8, wherein:

said cap member has an outer peripheral edge portion; and a plurality of fasteners are disposed within a circumferentially spaced array around said outer peripheral edge portion of said cap member for fixedly securing said cap member upon said housing.

* * * * *